United States Patent [19]

Davenport et al.

[11] Patent Number: 5,184,882

[45] Date of Patent: Feb. 9, 1993

[54] PROJECTION HEADLAMP LIGHTING SYSTEM USING DIFFERENT DIAMETER OPTICAL LIGHT CONDUCTORS

[75] Inventors: John M. Davenport, Lyndhurst; Richard L. Hansler, Pepper Pike; Lee E. Barnes, Jr., Willowick, all of Ohio

[73] Assignee: General Electric Company, Schenectady, N.Y.

[21] Appl. No.: 756,663

[22] Filed: Sep. 9, 1991

[51] Int. Cl.⁵ .............................................. F21V 7/04
[52] U.S. Cl. .................................. 362/32; 385/115; 385/901
[58] Field of Search ................ 362/32; 385/901, 115, 385/119

[56] References Cited

U.S. PATENT DOCUMENTS

| | | | |
|---|---|---|---|
| 3,430,057 | 2/1969 | Genahr | 385/115 |
| 3,554,721 | 1/1971 | Gardner | 385/115 |
| 4,173,392 | 11/1979 | Ekinaka et al. | 385/115 |

OTHER PUBLICATIONS

WO 82/02082, Jun. 24, 1982, International Application Inventor: Stensland, 13 pages.

*Primary Examiner*—Carroll B. Dority
*Attorney, Agent, or Firm*—George E. Hawranko; Stanley C. Corwin

[57] ABSTRACT

A projection headlamp lighting system includes a light source to generate light, a light distributing arrangement to distribute the light to a preselected lighting position, and a light projecting arrangement at the lighting position to project the light in the desired pattern. The light distributing arrangement includes a plurality of elongated optical light conductors being of different diameter sizes and having respective input and output ends. The light projecting arrangement includes a housing for holding the output ends of the optical light conductors in an array to project a desired light pattern that is substantially tailored to optimally fit a vehicle's field of illumination with minimal obstruction of the projected light.

21 Claims, 4 Drawing Sheets ated to the same assignee as the present invention. U.S. patent application Ser. No. 07/556,134 filed on July 23, 1990 by Davenport et al and assigned to the same assignee as the present invention discloses an arrangement for disposing a group of different diameter conductors in a housing to achieve a reduced space requirement configuration for the transmission medium. One design objective attained by the present projection lighting system is a substantial reduction in the amount of space needed to achieve proper vehicle forward illumination since there is no longer a need to have individual light source assemblies for up to four light source positions.

PROJECTION HEADLAMP LIGHTING SYSTEM USING DIFFERENT DIAMETER OPTICAL LIGHT CONDUCTORS

CROSS-REFERENCE TO RELATED APPLICATIONS

Reference is hereby made to the following copending U.S. patent applications dealing with related subject matter and assigned to the assignee of the present invention:

1. "Improved Light Source Design Using An Ellipsoidal Reflector" by John M. Davenport et al, assigned U.S. Ser. No. 07/660,388 and filed Feb. 25, 1991.
2. "Improved Remote Vehicle Lighting System" by John M. Davenport et al, assigned U.S. Ser. No. 07/661,029 and filed Feb. 25, 1991.

BACKGROUND OF THE INVENTION

1. Field of the Invention

The present invention relates generally to a projection headlamp lighting system and, more particularly, to one using optical light conductors of different diameter sizes having output ends arrayed for projecting an optimum non-symmetric light pattern relative to a vehicle's low beam illumination field.

2. Description of the Prior Art

It is well known that optical light conductors, such as light guide fibers, or fiber optics, may be used efficiently to carry or conduct the output of a light source to various locations without encountering any substantial transmission losses of the light. The light carried by the optical conductors is confined or condensed to the relatively small dimensions of the conductors themselves and is adaptable for use in various related space restrictive applications in automobiles and aircraft or other vehicles concerned with aerodynamic styling and efficiency.

For example, automotive styling must take into account the amount of frontal area necessary to provide the forward illumination needs for the automobile and provide means to reduce that area, and in particular, the height so as to satisfy aerodynamic considerations. The use of optical light conductors that conduct light within small confines are adaptable to these aerodynamic considerations. Further, optical conductors are advantageously adaptable to provide the overall illumination needs of the vehicle.

To reduce overall space requirements for vehicle forward illumination, one known projection headlamp lighting system employs a single light source to generate light, a light distribution arrangement composed of a plurality of optical light conductors to distribute the light to the various lighting positions, and a light projection arrangement composed of optical elements at the lighting positions to receive the light from the optical light conductors and project the light in the desired pattern. This projection headlamp lighting system is disclosed in U.S. Pat. Nos. 4,811,172 and 4,958,263 issued to Davenport et al and assigned to the same assignee as the present invention. The single light source can be of the type described in U.S. Pat. No. 4,958,263. The optical light conductors of the distribution arrangement can be a bundle of optical light guide fibers broken out and distributed as necessary. The light projection arrangement of optical elements can be an array of optical connector, lens, and mask elements as described in U.S. Pat. Nos. 4,868,718 and 4,949,227 issued respectively to Davenport et al and Finch et al and assigned to the same assignee as the present invention. U.S. patent application Ser. No. 07/556,134 filed on July 23, 1990 by Davenport et al and assigned to the same assignee as the present invention discloses an arrangement for disposing a group of different diameter conductors in a housing to achieve a reduced space requirement configuration for the transmission medium. One design objective attained by the present projection lighting system is a substantial reduction in the amount of space needed to achieve proper vehicle forward illumination since there is no longer a need to have individual light source assemblies for up to four light source positions.

However, another design objective which has yet to be achieved is the projection of light on a highway in a manner which utilizes the available light more efficiently. The point of maximum intensity suggested by SAE standards on low beam illumination is at 1.5 degrees down and 2 degrees right from the intersection of horizontal and vertical axes of a reference grid defining a vehicle's forward illumination field. The light projection arrangement of this prior art lighting system projects light in a symmetric pattern about this point of maximum intensity. Thus, some of the projected light must be shielded or masked to block the light from the portion of the illumination field in front of the car where it would glare in the eyes of a driver in an oncoming car. This can result in as much as one-half of the projected light being intercepted and lost.

In order to achieve more efficient utilization of the available light, the necessity to block some of the projected light must be minimized. Therefore, a need exists for a design which avoids the projection of a symmetric light pattern which must be masked to produce the low beam pattern.

SUMMARY OF THE INVENTION

The present invention provides a projection headlamp lighting system designed to satisfy the aforementioned needs. The projection headlamp lighting system of the present invention employs a plurality of optical light conductors of different diameter sizes which project a non-symmetric light pattern substantially tailored to satisfy highway illumination standards for the low beam pattern with minimal obstruction of the projected light.

Accordingly, the present invention is directed to a projection lighting system, comprising: (a) means for generating light; (b) means for receiving the light from the generating means and distributing the light to a preselected lighting position, the light distributing means including a plurality of elongated optical light conductors being of different diameter sizes and having respective input and output ends; and (c) means for receiving the light at the preselected lighting position from the light distributing means and for projecting the light from the output ends of the optical light conductors in a desired light pattern. The light projecting means including means in the form of a housing for holding the output ends of the optical light conductors in an array to project the desired light pattern, and means in the form of a lens disposed adjacent to the output ends of the conductors for receiving and focussing the light in the desired light pattern. Preferably, the ends of the conductors are located near the focal point of the lens.

Also, one of the optical light conductors has a diameter size larger than the diameter sizes of the remainder of the conductors. The output end of the one conductor is disposed at a central or middle location near the optical axis of the lens with the output ends of the remainder of the conductors arranged in two groups being disposed on opposite sides of the output end of the one conductor and extending horizontally in rows in opposite directions from the central conductor output end.

Further, in one embodiment, the output ends of the light conductors have end faces which are generally aligned with one another in a common plane. In modified embodiments, the output end of the one conductor has an end face disposed in a plane displaced from and generally parallel to the common plane of the end faces of the remainder of the conductors. The end of the one conductor is located near the focal point of the lens so that the projected light therefrom is sharply collimated while the light from those conductors further away from the lens is intentionally blurred and spread out.

These and other features and advantages and attainments of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the following detailed description, reference will be made to the attached drawings in which.

DETAILED DESCRIPTION OF THE INVENTION

Figure 1:
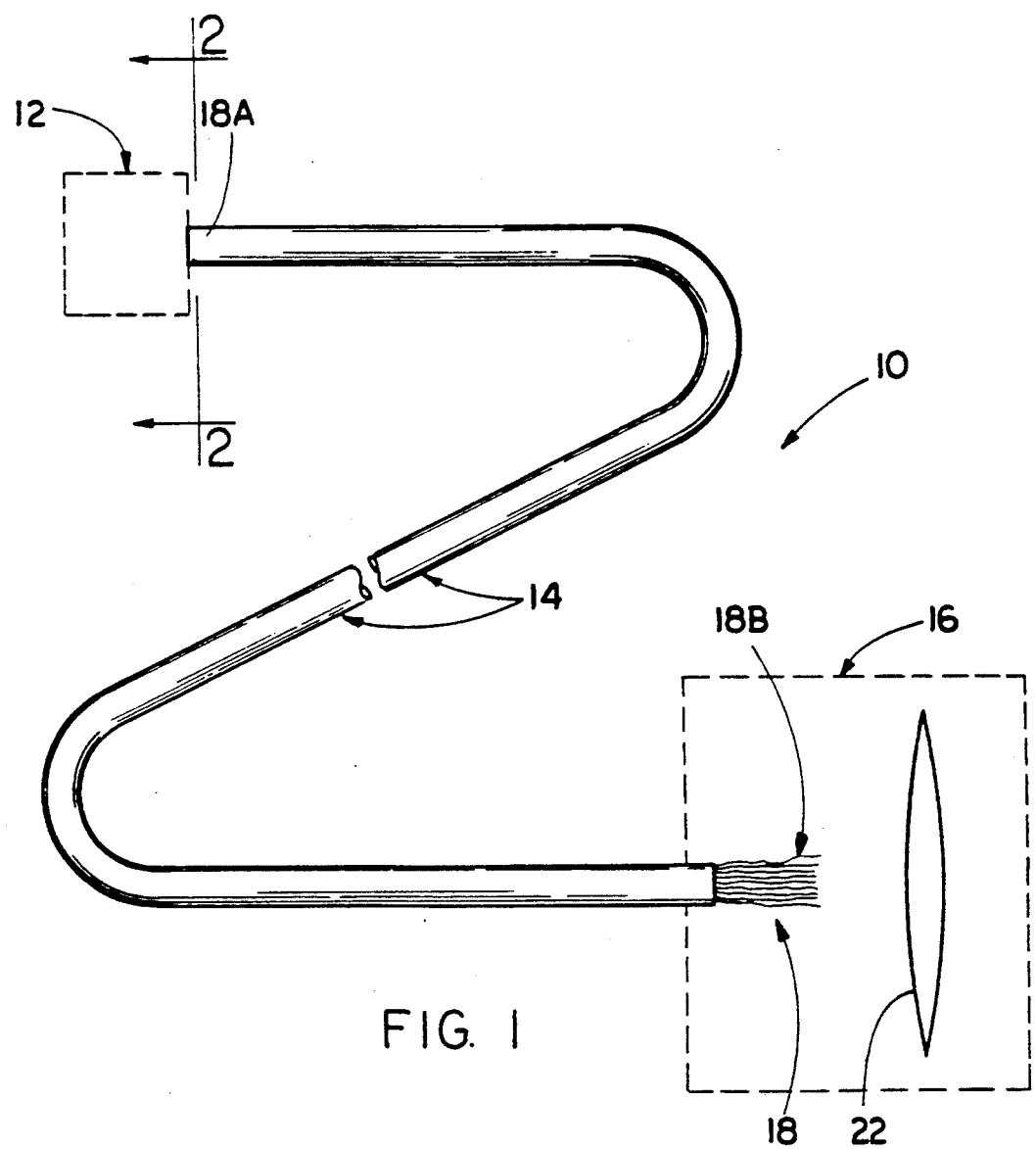
FIG. 1 is a schematically illustrated elevational view of a projection headlamp lighting system in accordance with the present invention.

In the following description, like reference characters designate like or corresponding parts throughout the several views. Also in the following description, it is to be understood that such terms as "forward", "rearward", "left", "right", "upwardly", "downwardly", and the like, are words of convenience and are not to be construed as limiting terms.

Referring now to the drawings, and particularly to FIG. 1, there is schematically illustrated a projection headlamp lighting system, generally designated 10, in accordance with the present invention. Basically, the projection headlamp lighting system 10 includes means 12 for generating light, means 14 for receiving the light from the generating means 12 and distributing or carrying the light to a preselected lighting position, and means 16 for receiving the light at the preselected position from the light distributing means 14 and projecting the light in a desired non-symmetric light pattern P (FIG. 5) for the low beam application. It should be understood here that the principles of the present invention are equally applicable for projecting the light in a desired symmetric light pattern (not shown) for the high beam application.

Figure 3:
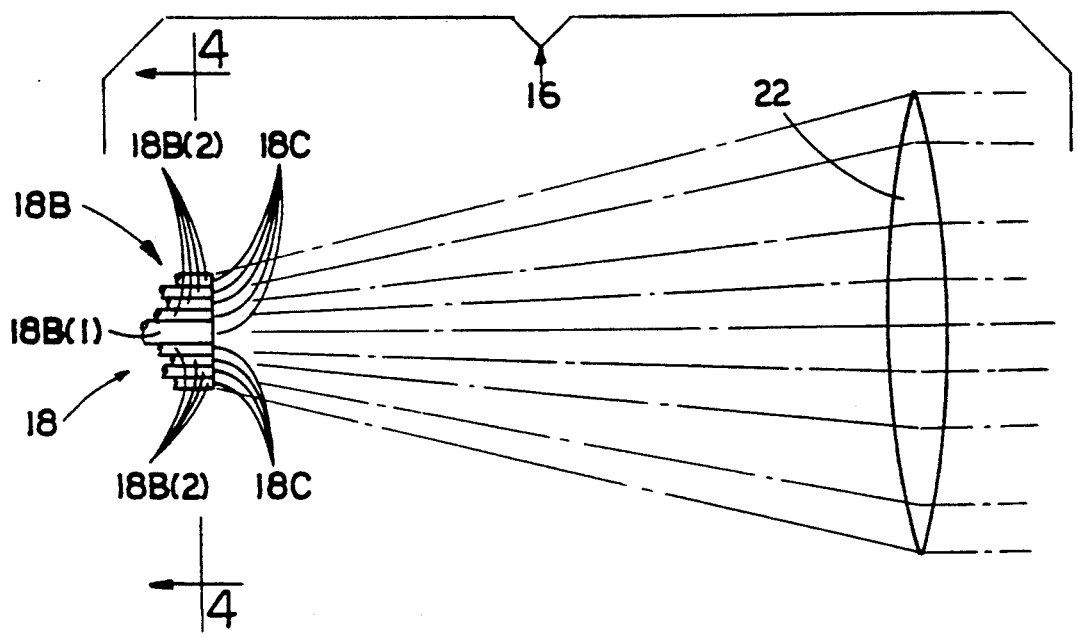
FIG. 3 is a schematically illustrated fragmentary top plan view of one embodiment of an array of output ends of the optical light conductors of the projection lighting system having different diameter sizes in accordance with the present invention.
Figure 4:
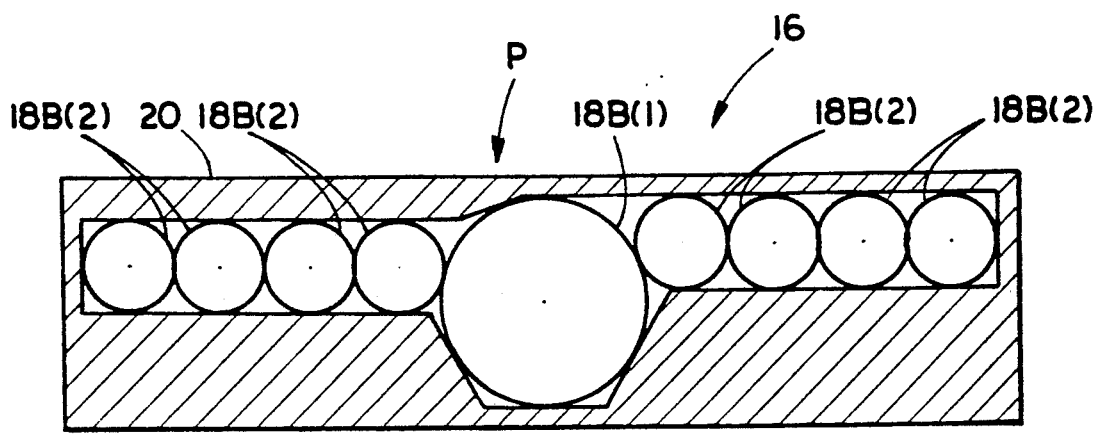
FIG. 4 is an enlarged, schematically illustrated front elevational view of the array of output ends of the optical light conductors as seen along line 4—4 of FIG. 3.
Figure 5:
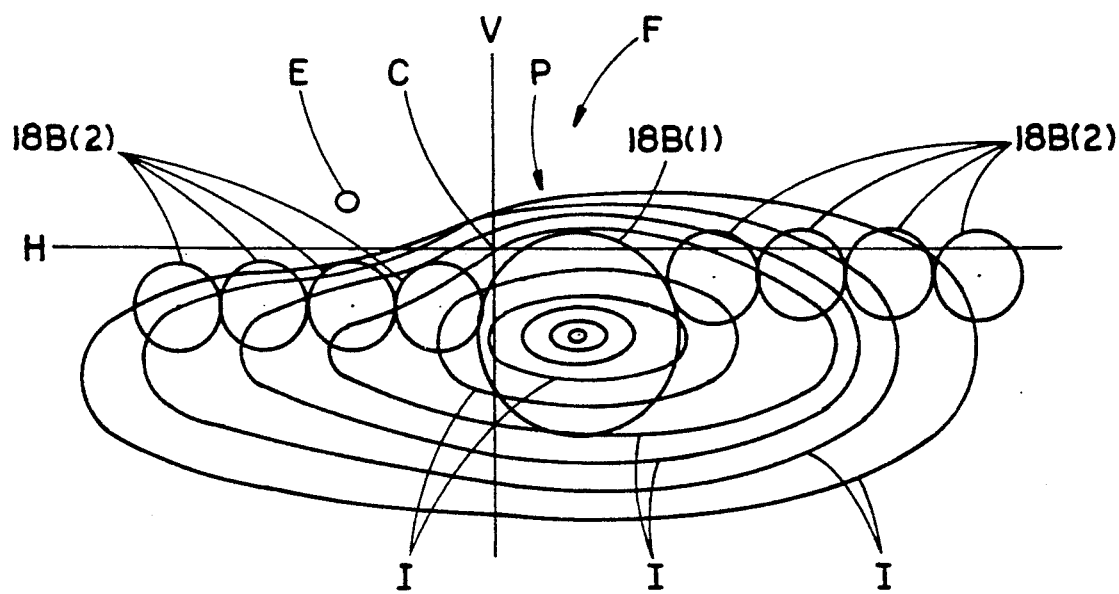
FIG. 5 is a schematically illustrated view of horizontal and vertical axes of a reference grid defining a vehicle's forward illumination field and a gradient map of the intensity of illumination across the field produced by the array of output ends of the different diameter size optical light conductors of the projection lighting system of FIGS. 3 and 4.

The light generating means 12 can take any suitable form. One suitable example can be found in U.S. Pat. No. 4,958,263 issued to Davenport et al on Sept. 18, 1990 and assigned to the same assignee as the present invention, the disclosure of which is incorporated herein by reference thereto. The light distributing mean 14 preferably includes a plurality of elongated optical light conductors 18, such as light guide fibers or fiber optics. As will be described in greater detail below, the light conductors 18 are of different diameter sizes and have respective input and output ends 18A, 18B. The light projecting means 16 preferably includes a coupler or housing 20, such as composed of a suitable plastic material, for holding the output ends 18A of the light conductors 18 in a desired array, such as seen in FIGS. 3 and 4, to project the non-symmetric light pattern P (FIG. 5). The light projecting means 16 also includes means 22 in the form of an optical lens disposed adjacent to the output ends 18B of the conductors 18 for receiving the light from the arrayed output ends 18 of the conductors 18 and focussing the light in the non-symmetric light pattern P.

Figure 2:
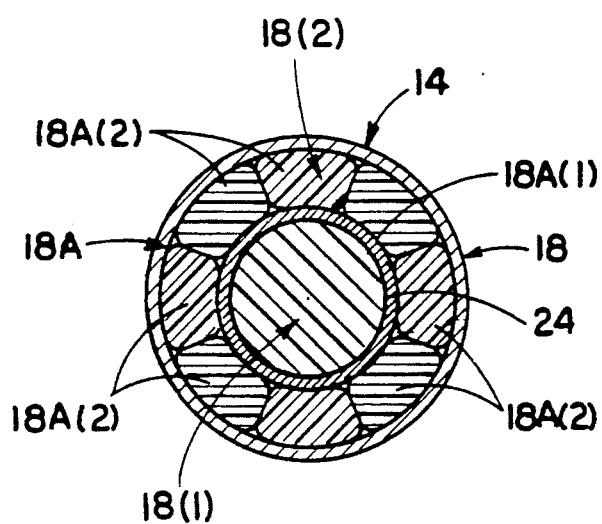
FIG. 2 is an enlarged, schematically illustrated cross-sectional view taken along line 2—2 of FIG. 1 of the input ends of a plurality of optical light conductors of the projection lighting system.

Referring to FIG. 2, there is illustrated the input ends 18A of the optical light conductors 18 positioned adjacent to the light generating means 12, preferably at a focal point thereof, to receive the highest percentage of input light as possible being generated by the light generating means 12. The input end 18A(1) of the larger diameter conductor 18(1) is preferably placed at the center of the hot spot of the light generating means 12 in order to gather and obtain the maximum brightness in the pattern P. For most efficient coupling, the input ends 18A of the conductors 18 are arranged in a circular array and compressed together as seen in FIG. 2. It should be noted that it is only necessary to compress the input ends 18A of the conductors 18 for a short distance adjacent the light source and not for the extended length of the conductors. Additionally, it will be noted in FIG. 2 that the central conductor 18A(1) has a cladding surface 24 disposed thereon.

Referring to FIGS. 3 and 4, there is illustrated one embodiment of the array of output ends 18B of the optical light conductors 18 for projecting the desired non-symmetric light pattern P. In accordance with the principles of the present invention, preferably one of the light conductors 18(1) has an output end 18B(1) that is of a diameter size larger than the diameter sizes of the output ends 18B(2) of the remainder of the light conductors 18(2). By way of example, the diameter of the central light conductor 18(1) can be about 3 mm, whereas the diameters of the remaining light conductors 18(2) can be about 1.5 mm. It should be understood that the remaining light conductors 18(2) can differ in diameter from one another also.

The output end 18B(1) of the one conductor 18(1) having the larger diameter is disposed at a middle location of the array with the output ends 18B(2) of the remaining conductors 18(2) are arranged in two groups disposed on a pair of opposite sides of the output end 18B(1) of the one conductor 18(1) and extend in rows in opposite directions from the central conductor output end 18B(1). Also, as best seen in FIG. 3, the output ends 18B(1) and 18B(2) of the light conductors 18(1) and 18(2) have end faces 18C which generally lie along and are aligned with one another in a common plane.

The focussing lens 22 is preferably located one focal length forwardly of the end faces 18C of the light conductor output ends 18B(1) and 18B(2) with the end face 18C of the larger central one output end 18B(1) being placed close to the focal point of the lens 22. The focal length of the lens 22 is chosen to provide the required maximum candlepower with the brightness which can be obtained from the end of the conductor 18. In a vehicular application, the height of the lens 22 will be limited by the design constraints of the vehicle, while the width of the lens 22 will mostly likely be limited by the lowest f/number lens that can be obtained, e.g. approximately f/0.85. While a Fresnel lens may be used to form the non-symmetric pattern P on the road, a molded plastic or glass aspherical lens produces an excellent beam pattern while greatly reducing the amount of scattered light which tends to cause glare.

Referring to FIG. 5, the preselected lighting position can be the front lighting location on a vehicle with the non-symmetric light pattern being projected to provide the vehicle's low beam illumination field F on the road. The low beam illumination field F is represented by the intersecting horizontal and vertical axes H and V. The non-symmetric light pattern P is represented by the gradient map of the intensities I of illumination across the field F. The eyes of a driver in an oncoming vehicle is represented by the point E. The output ends 18B(1) and 18B(2) of the conductors 18(1) and 18(2) are arranged in the illustrated array so as to accomplish two goals: (1) obtain a high maximum candlepower at the proper point (1.5 degrees down, 2 degrees right of the intersection C); and (2) provide a large number of lumens to the overall pattern so as to create a low beam that complies with all SAE point requirements. In some applications, it might be desirable to add a partial mask (not shown) to shade a portion of the larger diameter conductor output end 18B(1) adjacent the intersection C of the horizontal and vertical axes H and V of the field F to avoid glare points.

Figure 6:
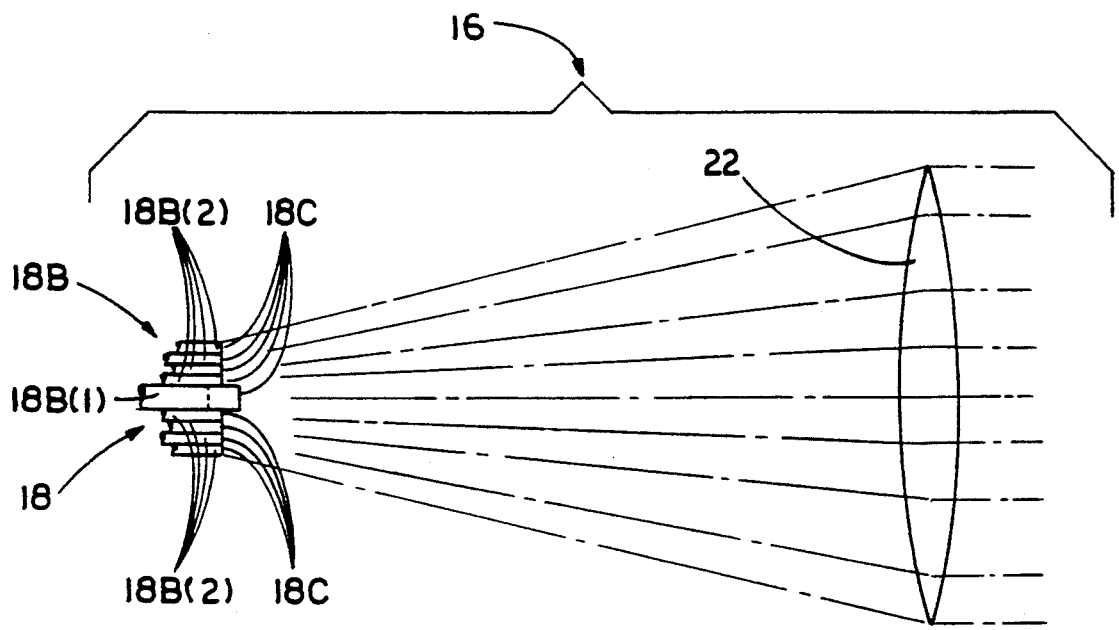
FIG. 6 is a schematically illustrated fragmentary top plan view of another embodiment of the array of output ends of the different diameter size optical light conductors of the projection lighting system of the present invention.
Figure 7:
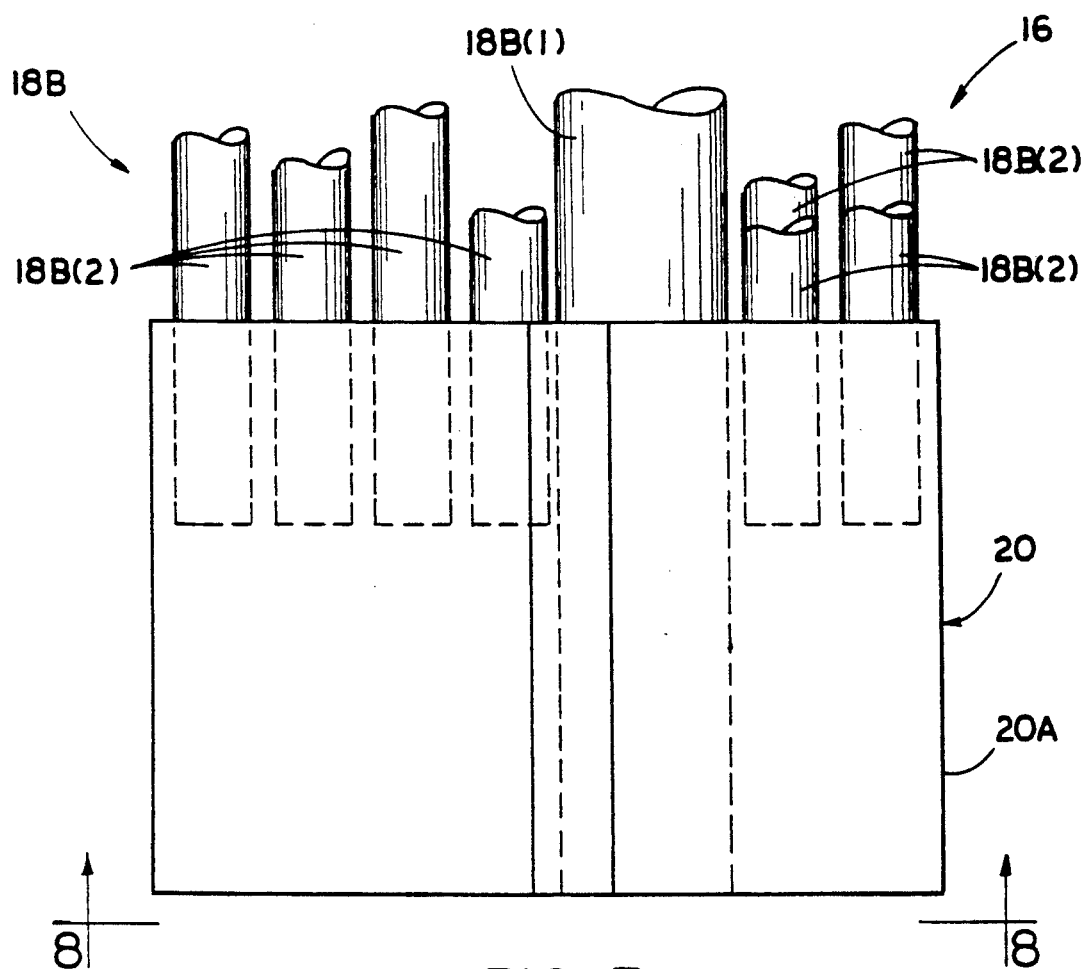
FIG. 7 is an enlarged, schematically illustrated fragmentary top plan view of still another embodiment of the array of output ends of the different diameter size optical light conductors of the projection lighting system of the present invention, the focussing lens being omitted therefrom.
Figure 8:
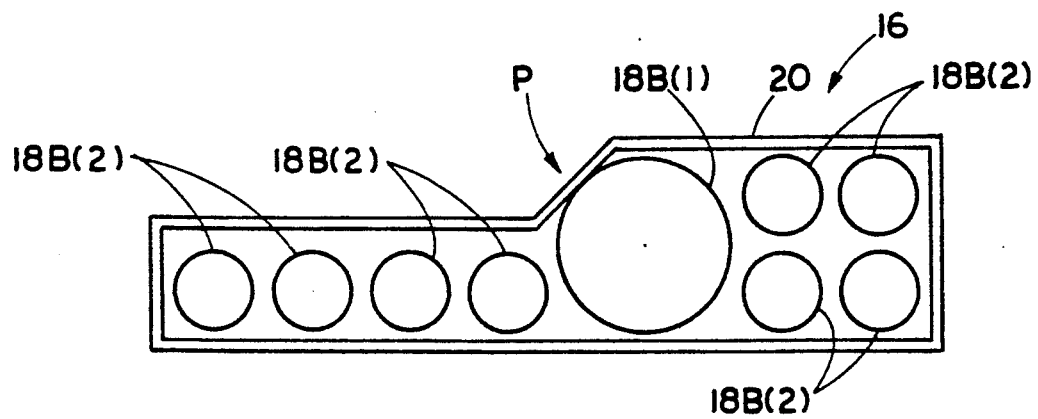
FIG. 8 is a schematically illustrated front elevational view of the array of output ends of the optical light conductors as seen along line 8—8 of FIG. 7.

FIGS. 6–8 illustrate modified embodiments of the arrays of output ends 18B(1) and 18B(2) of the optical light conductors 18(1) and 18(2). As shown in solid line form in FIG. 6, the end face 18C of the output end 18B(1) of the one conductor 18(1) is disposed in a plane displaced forwardly of and generally parallel to the common plane of the end faces 18C of the output ends 18B(2) of the remaining side conductors 18(2). As shown in dashed line form in FIG. 6, the end face 18C of the output end 18B(1) of the central one conductor 18(1) is disposed in a plane displaced rearwardly of and generally parallel to the common plane of the end faces 18C of the output ends 18B(2) of the remaining side conductors 18(2). In these embodiments, only the larger one conductor output end 18B(1) is located one focal length from the lens 22 so as to achieve maximum possible brightness in the central portion of the projected pattern. Thus, the light projected from the remaining smaller side output ends 18B(2) appears blurred in the non-symmetric pattern, that is, their end faces 18C are not imaged sharply but are smoothed out in the pattern.

FIGS. 7 and 8 illustrates a modified embodiment in which a coupler or housing 20 has a hollow extension 20A located between the lens (not shown) and the end faces 18C of the conductor output ends 18B(1) and 18B(2) so as to combine the light and smooth out the non-symmetric pattern. Also, the conductor output ends 18B(2) on the right side of the central output end 18B(1) are arranged into two shorter rows stacked one on top of the other instead of one longer row as on the left side.

It is thought that the present invention and many of its attendant advantages will b understood from the foregoing description and it will be apparent that various changes may be made in the form, construction and arrangement of the parts thereof without departing from the spirit and scope of the invention or sacrificing all of its material advantages, the forms hereinbefore described being merely preferred or exemplary embodiments thereof.

We claim:

1. A projection lighting system, comprising:
   (a) means for generating light;
   (b) means for receiving the light from said generating means and for distributing the light to a preselected lighting position, said light distributing means including a plurality of elongated optical light conductors being of different diameter sizes and having respective input and output ends;
   (c) second means for receiving the light at said preselected lighting position from said light distributing means and for projecting the light from said output ends of said optical light conductors in a desired light pattern;
   (d) wherein at least one of said optical light conductors has a diameter size larger than the diameter sizes of the remainder of said conductors;
   (e) wherein said output end of said one conductor is disposed in a manner so as to have a group of said remainder of conductors arranged on at least one side thereof; and
   (f) wherein said light projecting means includes means for receiving and focussing the light in said desired light pattern.

2. The system as recited in claim 1, wherein said light projecting means includes means for holding said output ends of said optical light conductors in an array to project said desired light pattern.

3. The system as recited in claim 2, wherein said holding means is a housing.

4. The system as recited in claim 1, wherein said input ends of said optical light conductors are positioned adjacent said light generating means to receive light generated by said light generating means.

5. The system as recited in claim 1, wherein said focussing means is a lens disposed adjacent to said output ends of said optical light conductors.

6. The system as recited in claim 1, wherein said holding means is a housing having a hollow extension disposed between said focussing means and said output ends of said light conductors.

7. The system as recited in claim 1, wherein said output ends of said one conductor and said remainder of said conductors have end faces being generally aligned with one another in a common plane.

8. The system as recited in claim 1, wherein said output ends of said remainder of said conductors have end faces being generally aligned with one another in a common plane, said output end of said one conductor has an end face being disposed in a plane displaced from said end faces of said remainder of conductors.

9. The system as recited in claim 1, wherein said one conductor terminates near the focal point of said focussing means so as to provide intense light near the center of said light pattern.

10. The system as recited in claim 1, wherein said one conductor is disposed in a middle position and said remainder of said conductors are arranged in two groups disposed on opposite sides of said one conductor and extending in horizontal rows in opposite directions from the conductor output end.

11. A projection headlamp lighting system, comprising:
 (a) means for generating light;
 (b) means for receiving the light from said generating means and for distributing the light to a preselected lighting position, said light distributing means including a plurality of elongated optical light conductors being of different diameter sizes and having respective input and output ends;
 (c) means for receiving the light at said preselected lighting position from said light distributing means and for projecting the light from said output ends of said optical light conductors in a desired light pattern substantially tailored to satisfy highway illumination standards with minimal obstruction of the projected light; and
 (d) said light projecting means including means for holding said output ends of said optical light conductors in an array to project said desired light pattern, and means for receiving and focussing the light in said desired light pattern.

12. The system as recited in claim 11, wherein said holding means is a housing.

13. The system as recited in claim 11, wherein said input ends of said optical light conductors are positioned adjacent said light generating means to receive light generated by said light generating means.

14. The system as recited in claim 12, wherein said focussing means is a lens disposed adjacent to said output ends of said optical light conductors.

15. The system as recited in claim 14 wherein said housing having a hollow extension disposed between said lens and said output ends of said light conductors.

16. The system as recited in claim 11, wherein at least one of said optical light conductors has a diameter size larger than the diameter sizes of the remainder of said conductors.

17. The system as recited in claim 16, wherein said output ends of said one conductor and said remainder of said conductors have end faces being generally aligned with one another in a common plane.

18. The system as recited in claim 16, wherein said output ends of said remainder of said conductors have end faces being generally aligned with one another in a common plane, said output end of said one conductor has an end face being disposed in a plane displaced from said end faces of said remainder of conductors.

19. The system as recited in claim 18, wherein said one conductor terminates near the focal point of said focussing means so as to provide intense light near the center of said light pattern.

20. The system as recited in claim 16, wherein said output end of said one conductor is disposed at a middle location and said output ends of said remainder of said conductors are arranged in two groups disposed on a pair of opposite sides of said one conductor and extending in rows in opposite directions from the central conductor output end.

21. The system as recited in claim 16, wherein said at least one larger diameter optical light conductor has a cladding surface disposed thereon.

* * * * *